United States Patent [19]

Pafilis

[11] Patent Number: 4,937,124
[45] Date of Patent: Jun. 26, 1990

[54] NONSKID ELEMENT

[76] Inventor: Michail Pafilis, Weststrasse 25, 5880 Lüdenscheid, Fed. Rep. of Germany

[21] Appl. No.: 360,252

[22] Filed: Jun. 2, 1989

[30] Foreign Application Priority Data

Oct. 5, 1988 [DE] Fed. Rep. of Germany ... 8812501[U]

[51] Int. Cl.$^5$ ............................................... B32B 1/04
[52] U.S. Cl. ..................................... 428/100; 428/119
[58] Field of Search ................... 428/100, 121, 80, 119

[56] References Cited

U.S. PATENT DOCUMENTS

| 4,489,115 | 12/1984 | Layman et al. | 428/100 |
| 4,620,396 | 11/1986 | Bjorntwedt | 428/100 |
| 4,794,028 | 12/1988 | Fisher | 428/100 |
| 4,842,916 | 6/1989 | Ogawa et al. | 428/100 |

Primary Examiner—Alexander S. Thomas
Attorney, Agent, or Firm—Edwin D. Schindler

[57] ABSTRACT

A nonski element as a antislipping means on a carpet-like floor covering. A web includes a plain bottom wall, and the bottom wall includes a covering with band-like holding pins.

5 Claims, 2 Drawing Sheets

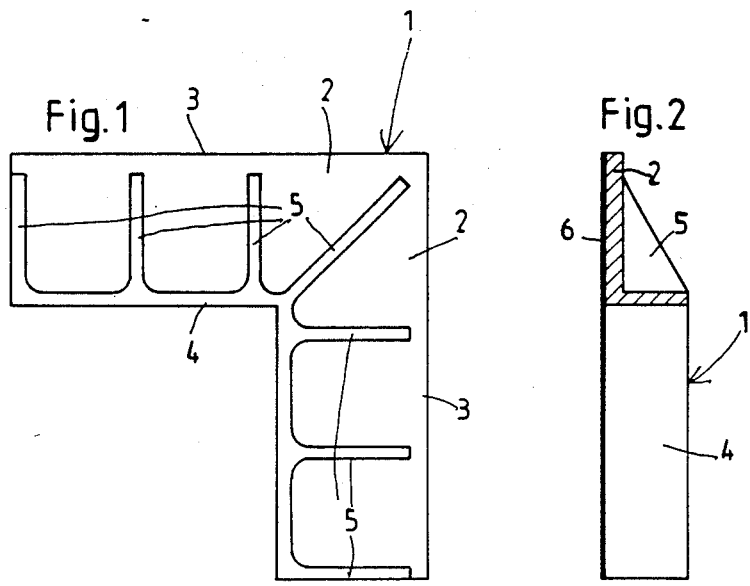
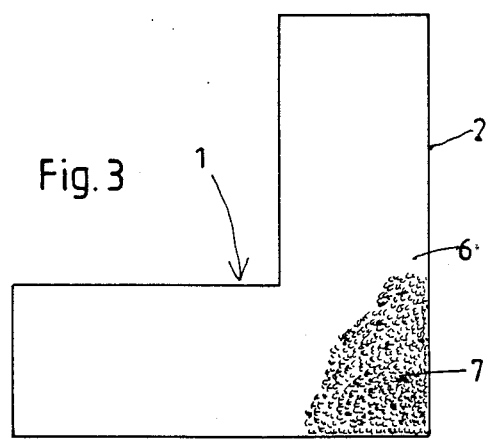

NONSKID ELEMENT

BACKGROUND OF THE INVENTION

1. Field of the Invention

The invention relates to a nonskid element.

Field of application of the invention is the fixing of subjects within a transport space, particularly in a rear trunk of a motor vehicle.

2. Summary of the Invention

One object of the invention is to provide a simple and effective antislipping means for items on a carpet-like floor covering.

According to the invention this object is solved in that a web comprises a plain bottom wall and that the bottom wall comprises a covering with burlike holding pins.

The invention differs from the prior art in that by the hook-like elements of the band-fastener an intensive adherence of the nonskid element to the carpet-like covering is secured. The nonskid element is secured against motions within the plain of the floor. However it is possible to separate the nonskid element from the carpet-like covering without difficulty and to displace same thereon so that an adaptation to any articles to be transported is possible.

A stable fixing of particularly high subjects such as cases for bottles is guaranteed in that a supporting wall borders to one side of the bottom wall.

A reliable edge stabilization of the articles to be transported is reached in that the bottom wall is provided in the form of two webs joined to each other at right angles, and that the supporting wall is arranged on the inner side of the angle formed by the webs.

Antislip holding frames can be provided in that, on the narrow sides of the nonskid element, coupling elements, formed in a matching manner, for adjacent nonskid elements, are provided.

The nonskid elements can be adapted to transport articles of any shape in that, on the narrow sides of the nonskid element, coupling joints are provided, for the connecting of further nonskid elements.

BRIEF DESCRIPTION OF THE DRAWING

Embodiments of the invention will be described in the following with reference to the accompanying drawings, wherein FIG. 1 is a top view of the nonskid element, FIG. 2 is a side view in regard to FIG. 1, FIG. 3 is a bottom view in regard to FIG. 1.

DESCRIPTION OF THE PREFERRED EMBODIMENT

Figure 4:
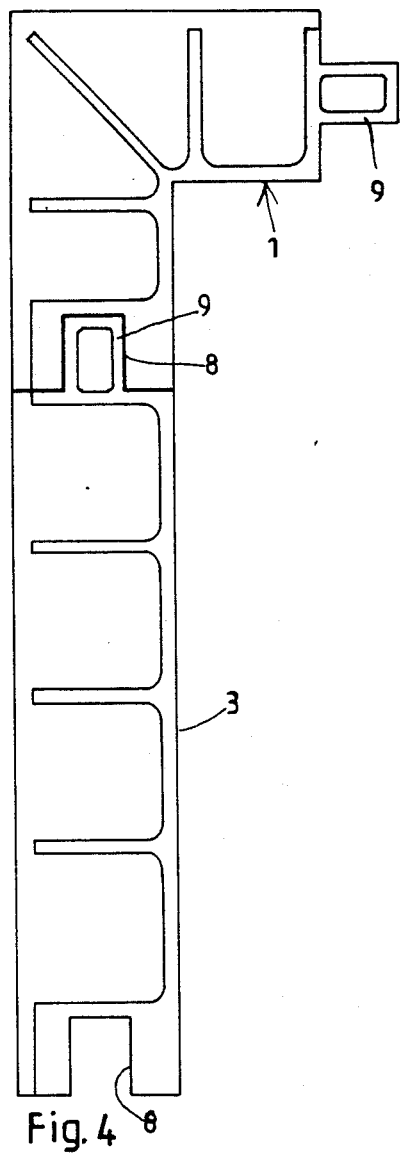
FIG. 4 is an illustration of nonskid elements with coupling elements, whilst

FIG. 1 shows a nonskid element 1 which has an angular outline and the bottom wall 2 of which consisting of two webs 3 joined to each other at right angles. On the inner side of the angle formed by the webs 3 a supporting wall 4 is provided which limits a right angle and is supported on the bottom wall 2 by braces 5.

The bottom wall 2 is provided with a covering 6, which comprises burlike holding pins 7 in hook-form. Such burlike holding pins 7 are known by band-fasteners or clamping fasteners and cooperate with a velvet-like counter-covering. The burlike holding pins 7 and the covering 6 may also be provided integrally on the bottom wall 2. That is possible particularly in such a case if the nonskid element 1, together with the covering 6 and the holding pins 7, is provided as a one-piece plastic material injection-molded component. The velvet-covering acting as counter-element for the burlike holding pins 7 is realized, for example, by the floor covering in a rear trunk of a motor vehicle. The nonskid element may be placed thereon and is positioned on the covering of the rear trunk in a stable manner resistant to skidding by the effect of the band-fastener. The nonskid element assures the fixing and holding of articles, such as suitcases, bags, boxes, cartons, cases for bottles and the like. Normally two nonskid elements are perfectly satisfactory which are to be arranged diagonally on the corners of the specific object.

Otherwise the covering 6 may be a band-like element which is glued to the bottom wall 2.

However, according to FIG. 4 it is possible to provide on the narrow sides of the nonskid elements matching recesses 8 and projections 9, a projection 9 engaging a recess 8 in each case. Thus, it is possible to build nonskid frames from the nonskid elements. The coupling elements on the recesses 8 and the projections 9 allow a movable lining up of the nonskid elements.

Figure 5:
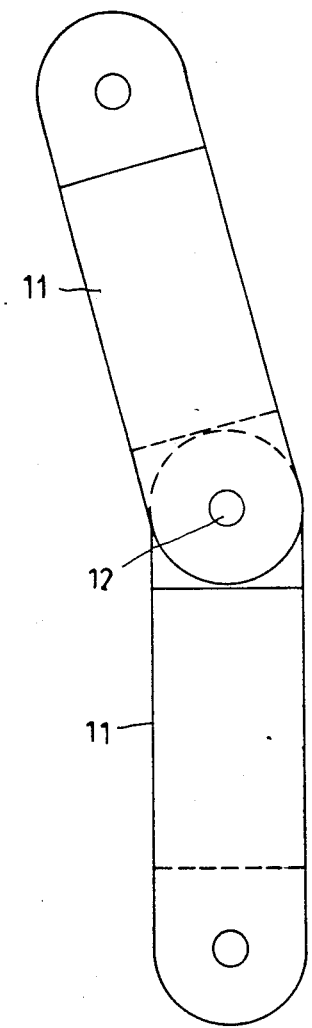
FIG. 5 is an illustration of nonskid elements with coupling joints.

According to FIG. 5 it is also possible to connect adjacent nonskid elements 11 by a coupling joint 12 so that it is possible to adjust adjacent nonskid elements at any desired angle to one another. Thus, it is possible to adapt the nonskid elements to round articles or to non-rectangular articles.

Of course, the nonskid elements may have any desired profile in the cross-section.

We claim:

1. A nonskid element, comprising:
    a covering with bur-shaped holding pins;
    a bottom wall in a form of two webs joined to one another at a right angle, said bottom wall further including said covering with said bur-shaped holding pins; and,
    a supporting wall bordering on one side of said bottom wall, said supporting wall being arranged on an inner side of the angle formed by said webs of said bottom wall.

2. The nonskid element according to claim 1, wherein said covering is integrally formed with said bottom wall.

3. The nonskid element according to claim 1, wherein said covering is a band-shaped element which is fixed to said bottom wall.

4. The nonskid element according to claim 1, further comprising coupling elements along a narrow side of said nonskid element, formed in a matching manner, for coupling to an adjacent nonskid element.

5. The nonskid element according to claim 1, further comprising coupling joints along a narrow side of said nonskid element for connecting to an adjacent nonskid element.

* * * * *